Nov. 14, 1967  J. W. DRAYTON ET AL  3,352,260
LEAF BURNER

Filed Sept. 23, 1965  2 Sheets-Sheet 1

INVENTORS
JOHN W. DRAYTON
HENRY R. BLYNN

BY
ATTORNEYS

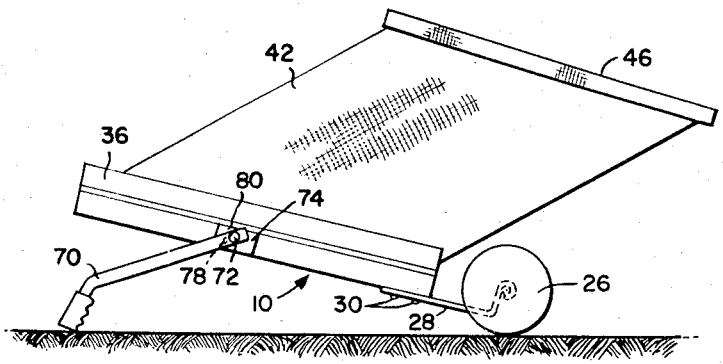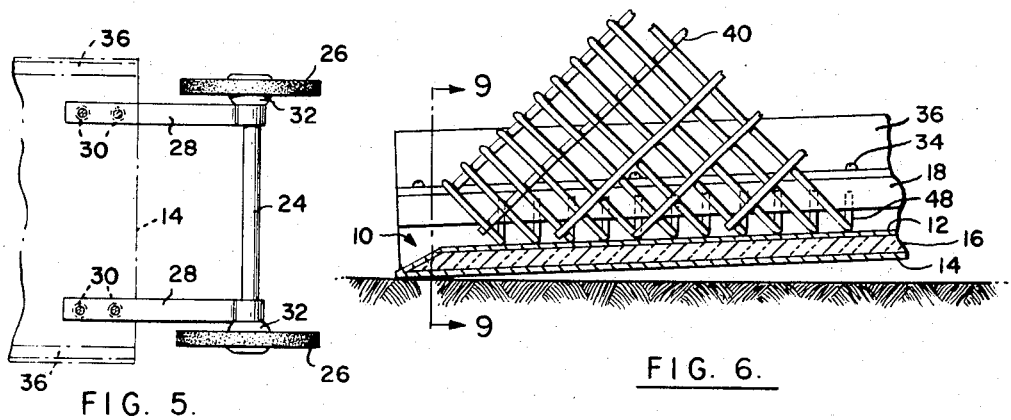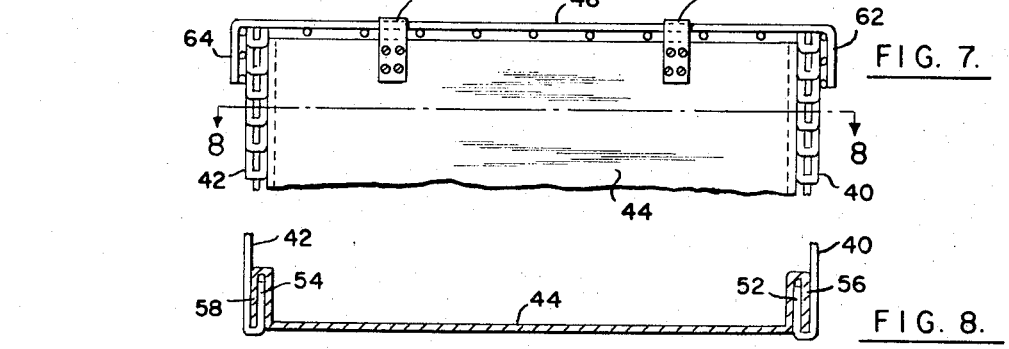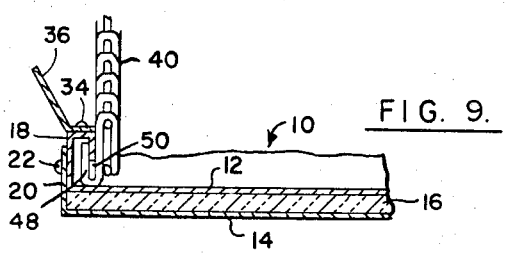

United States Patent Office 3,352,260
Patented Nov. 14, 1967

3,352,260
LEAF BURNER
John W. Drayton, 220 Darby Road, Paoli, Pa. 19301, and Henry Reid Blynn, 423 Conestoga Road, Wayne, Pa. 19087
Filed Sept. 23, 1965, Ser. No. 489,717
16 Claims. (Cl. 110—19)

ABSTRACT OF THE DISCLOSURE

A portable burner for leaves and the like having a burner chamber provided with an opening, through which leaves or the like may be raked into the burner chamber and which slants upwardly and rearwardly at a substantial angle to a bottom tray to facilitate the raking of leaves into the burner chamber.

---

This invention relates to burners for leaves and other household rubbish or the like.

Many householders are faced with the problem of disposing of fallen leaves which have accumulated to a large volume and are spread out over a large area. This problem is often aggravated by rain or ground moisture which can make the leaves so wet that disposal thereof by burning is difficult. Moreover, the disposal of leaves by burning presents the problem of avoiding damage to the lawn or other areas at the burning location, and presents a fire hazard wherefore many communities restrict, by law, the burning of leaves to an incinerator.

It is the general object of the present invention to provide a leaf burner which overcomes the above-discussed problems of disposing of leaves and other household rubbish. This object is achieved in accordance with the invention by providing a leaf burner (1) which is light and portable so that it can be moved easily to the leaves whereby the tedious job of moving the leaves a substantal distance is obviated, (2) which is constructed so that leaves may be raked directly into the burner from the ground whereby the raker may remain in a standing position, (3) which has a large capacity which can be completely filled by raking, (4) which may be easily and safely moved while burning is taking place, (5) which traps the leaves within the burner so that they cannot be blown out readily, and (6) which is collapsible so that it will take up a minimum of space when stored or shipped.

The above and other objects and features of the invention will become apparent from a consideration of the following description in conjunction with the accompanying drawings, in which:

FIGURE 4 is another side elevation of the leaf burner shown in FIGURE 1 with the burner being arranged in an alternate position;

FIGURE 5 is a section taken on line 5—5 of FIGURE 1;

Figure 2:
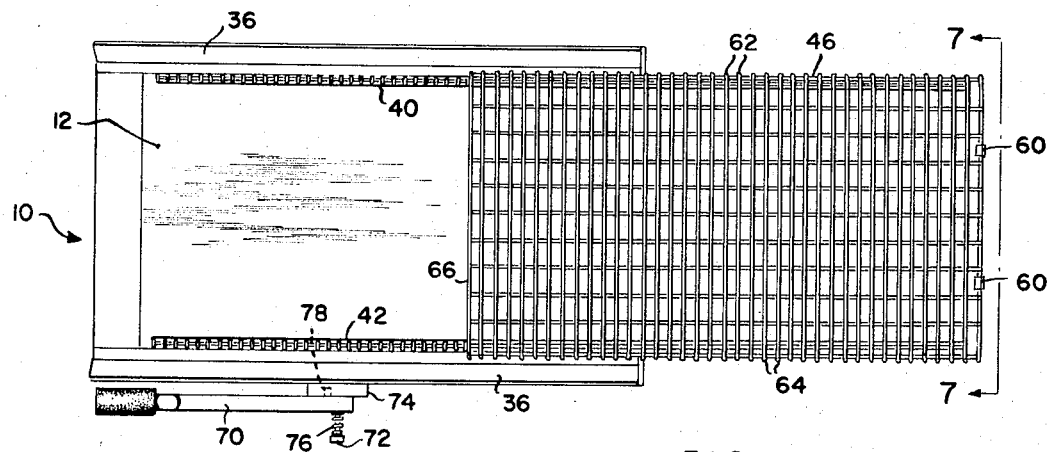
FIGURE 2 is a plan view of the leaf burner shown in FIGURE 1.
Figure 3:
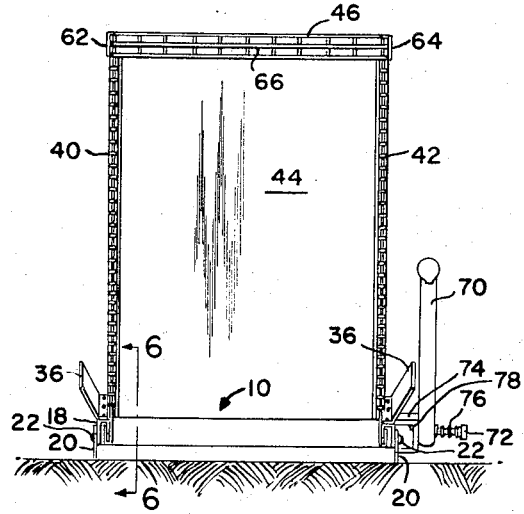
FIGURE 3 is a front elevation of the leaf burner shown in FIGURE 1.

FIGURE 6 in an enlarged section taken on line 6—6 of FIGURE 3;

FIGURE 7 is an enlarged fragmentary view taken on line 7—7 of FIGURE 2;

FIGURE 8 is a section taken on line 8—8 of FIGURE 7; and

FIGURE 9 is a section taken on line 9—9 of FIGURE 6.

Referring to the drawings, the leaf burner in accordance with the invention comprises a base structure including a flat rectangular tray 10 consisting of a pair of plates 12 and 14 secured together to provide a space therebetween. The space may be filled with a suitable heat insulation material 16, such as Fiberglas, or may provide a convection air space. The plates 12 and 14 are provided with vertically extending side flanges 18 and 20, respectively, on each side, the flanges 18 and 20 extending in side-by-side relation as is best shown in FIGURE 9. The flanges 18 and 20 are secured together by suitable means such as rivets 22.

An axle 24 carrying a pair of wheels 26 at its ends is secured in the horizontal position to the rear end of the tray 10 by means of a pair of spaced brackets 28. The brackets 28 are secured on the bottom plate 12, as by rivets 30, and project therefrom to engage the axle 24. A suitable rolling bearing means 32 is provided to permit rotation of the wheels 26 relative to the axle 24.

Each of the flanges 18 has a turned end which extends inwardly and then downwardly as is best shown in FIGURE 9. Mounted on top of the inwardly extending portion of the ends of each flange 18, as by rivets 34, is an upwardly extending side plate 36. Each of the plates 36 extends throughout the length of the tray 10 and is inclined outwardly. The side plates 36 serve as an ash retaining means for holding hot ashes within the burner during the burning operation.

Wall means are provided to define the burning chamber in conjunction with the tray 10, such means comprising a pair of side walls 40 and 42, a rear wall 44 and a top wall 46. The side walls 40 and 42 are made of a suitable screening having the desired strength characteristics, i.e. the walls must be self supporting or capable of maintaining their shape when supported in horizontal or vertical positions. The top wall 46 is also made of a screening similar to the side walls. The rear wall 44, however, is made of a solid sheet as is best shown in FIGURE 8.

Figure 1:
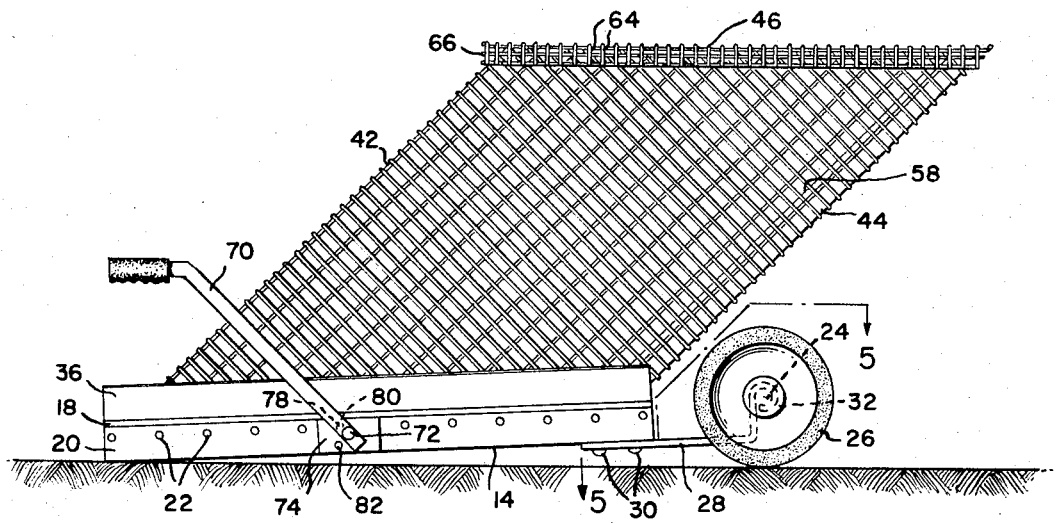
FIGURE 1 is a side elevation of a leaf burner in accordance with the invention.

As is shown in FIGURE 1, the side walls 40 and 42 are formed in the shape of a parallelogram, although they may be of some other shape consistent with the invention. The top and the bottom edges of the walls 40 and 42 are parallel to the plane of the tray 10, and the front edges (at the left end as viewed in FIGURE 1) are inclined toward the rear of the burner. The rear edges (at the right as viewed in FIGURE 1) of the walls 40 and 42 are also inclined towards the rear of the burner and are parallel to the front edges.

The side walls 40 and 42 are mounted on the base structure of the burner by an arrangement involving the interlocking of the bottom edges with the turned ends of the flanges 18. The vertically extending portions of the turned ends of the flanges 18 provide elongated tracks or slides. The bottom edges of the side walls 40 and 42 are formed with members 48 bent to form an elongated channel 50 adapted to receive the track forming portion of the flanges 18 as is shown in FIGURE 9. Accordingly, the side walls 40 and 42 are mounted on the base structure by sliding the channel forming members 48 into engagement with the tracks of flanges 18 to the position shown in the drawings. It will be noted that both of the side walls 40 and 42 have a similar construction and are mounted to the base structure by the same interlocking arrangement with the walls being in alignment.

At the rear edges of the side walls 40 and 42 there are provided a plurality of members 52 and 54, respectively, bent to extend forwardly from the rear edge and define a track-like supporting structure. The rear wall 44 is provided at its side edges with turned flange portions 56 and 58, each defining a channel adapted to receive, respectively, the members 52 and 54 of the side walls 40 and 42 as is best shown in FIGURE 8. The rear wall 44 is mounted on the base structure by interlocking the flange portions 56 and 58 with the members 52 and 54 of the side walls 40 and 42, respectively as is best shown in FIGURE 8. As is best shown in FIGURE 3, the rear wall 44 provides a solid or non-perforate backing for the burner and extends from the rear edge of the tray 10 to the top edges of the side walls 40 and 42.

The top wall 46 is hingedly connected to the rear wall 44 by means of a pair of hinges 60. One hinge element is secured to the top portion of the rear wall 44 and the other hinge element is secured to the rear portion of the top wall 46. At the side edges of the top wall 46 there are formed downwardly extending portions 62 and 64 which extend on the external face of the side walls 40 and 42, respectively, along the top edges thereof. The front edge of the top wall 46 is also provided with a similar downwardly extending portion 66 as shown in FIGURE 3. It will thus be evident that in the assembled condition of the burner, the top wall 46 rests on the top edges of the side panels 40 and 42.

The various walls are constructed to provide sufficient strength to be self-supporting and to support cooperating walls so that the shape of the burner will be maintained. By way of a specific example, the plates forming the tray 10 and the rear wall 44 may be made of 18 gauge and 24 gauge sheet metal, respectively, and the screening for sides 40 and 42 and the top 46 may be made of 0.081 inch steel wire made to form one inch by two inch rectangular openings. A typical example of the capacity of the burner constructed as indicated above would be about twenty cubic feet.

A handle 70 is provided so that the burner may be grasped for moving purposes. This handle 70 is mounted on the right side of the base structure, as viewed in FIGURE 3, by means of a pivot pin 72 extending horizontally from a bracket 74 secured to the side flanges of the base structure. The pivot pin 72 extends laterally outwardly from the bracket 74 to permit lateral movement of the handle 70 along the pin, a spring 76 being provided to urge the handle 70 toward the bracket 74. The handle carries a pin 78 which extends laterally inwardly toward the bracket 74 which is provided with a pair of positioning holes 80 and 82. The pin 78 and the holes 80 and 82 are arranged so that the handle 76 may be pivoted to alternate positions wherein the pin 78 can be moved into engagement with either of the holes 80 and 82.

When the pin 78 is in engagement with the upper hole 80, as shown in FIGURE 1, the handle 70 will extend forwardly and upwardly from the tray 10 whereby the burner may be positioned with the forward end of the tray 10 in contact with the ground. When it is desired to move the burner the handle can be used to lift the burner so that it is supported on the ground only by means of the wheels 26. When the handle 70 is positioned with the pin 78 in engagement with the lower hole 82, the handle 70 will extend from the pivot point forwardly and downwaardly from the tray 10 shown in FIGURE 4. In this position the handle 70 serves as the support for the front end of the burner on the ground with the base structure being held above the ground. In this position of the burner, the burning chamber is adapted to receive leaves which are dumped into the open mouth from a container. In some cases it may be more practical for the householder to gather the leaves in large quantities rather than to rake them directly into the leaf burner. For example, when leaves are scattered widely over a large area in a light density, the householder may use a lawn sweeper to gather the leaves and then dump the leaves from the lawn sweeper into the burner. In this case, it would be more advantageous to have the burner in the tilted position shown in FIGURE 4.

In the use of the leaf burner in accordance with the invention, the householder will take the burner from its stored location whereat the burner may be in a collapsed condition, and will then assemble the leaf burner in preparation for use. In the collapsed condition of the apparatus, the burner will consist of four parts, the base structure including the wheels and handle, the two sides and the hinged rear and top walls. It will be apparent that these parts can be stored so as to take up a minimum of space.

The burner is assembled by simply sliding the two side walls 40 and 42 onto the base structure by sliding the channel forming members 48 into interlocking engagement with the track forming portions of the turned ends 18 of the tray. The rear wall 44 is then slid into engagement with the channel forming members 52 and 54 to provide interlocking engagement between such members and the flanges 56 and 58 as discussed above. The top wall 46 is then pivoted to the position shown in the drawings wherein the top wall rests on the top edges of the side walls 40 and 42 with the side flanges 62 and 64 exteriorally of the outer faces of the side walls 40 and 42. The leaf burner is now in an assembled condition for use in the collection and burning of leaves.

The leaf burner may be used in several ways. For example, the leaf burner may be positioned as shown in FIGURE 1 with the front end of the tray 10 resting on the ground, the rear end being supported by the wheels 26. In this condition of the apparatus, the tray 10 is in an inclined condition with respect to the ground to provide an easy platform onto which the leaves may be raked. By reason of the slanting construction of the side walls 40 and 42, the burner presents an opening which will not interfere with the normal raking action whereby the raking may be achieved very easily. By reason of the light weight and the portable construction, the leaf burner can be moved easily to the location of the leaves. When a desired quantity of leaves are delivered or raked into the burner chamber, the householder may ignite the leaves by various means.

Even with the leaves in the burning condition, the leaf burner may be moved to various locations with safety. This is because of the handle 70 which is arranged to extend to a position whereat it will not be overheated by the heat of the burning leaves.

It will be noted that the leaf burner construction provides a very effective trap for the leaves and also provides for sufficient draft for the burning operation. Also, by reason of the arrangement forming a burning chamber which slants rearwardly in a parallelogram-like configuration, the entire burning chamber as defined by the burner walls may be filled to provide a large volume of leaves. If the front edges of walls 40 and 42 extended vertically from the front end of tray 10, the entire enclosed burning chamber could not be filled wherefore a portion of the screening would be wasted.

The leaf burner may also be used in the position shown in FIGURE 4 with the end of the handle 70 supporting the front end of the tray 10 so that this end is spaced from the ground. This provides a convenient receptacle for the leaves. In this position, leaves which have been accumulated in quantities by various means may be dumped into the chamber and burning may take place in the usual manner.

When the householder has completed the disposal of the leaves and/or other rubbish by burning as described above, the burner may be returned to its stored location. If the burner is to be stored in its disassembled condition, the householder simply removes the hinged walls 44 and 46 by sliding the flanges 56 and 58 from the track provided by members 52 and 54. The walls 40 and 46 are then pivoted to a flat condition. The side walls 40 and 42 are then removed from the base structure by sliding them so that the members 48 are removed from the track forming portions of flanges 18. The disassembled parts may then be positioned in a minimum stored area.

It will be apparent that various changes may be made in the construction and arrangement of the parts of the leaf burner without departing from the scope of the invention. Accordingly, it is not desired to be limited except as required by the following claims.

What is claimed is:

1. A portable burner for leaves and other rubbish comprising a base structure including a bottom tray, a pair of spaced side walls extending upwardly from said tray, a rear wall extending upwardly from the rear end of said tray and intersecting said side walls, and a top wall extending between said side walls and forwardly from said rear wall, said walls and said tray defining a burning chamber therein and an opening facing forwardly through which material may be delivered into the burning chamber, said opening slanting upwardly and rearwardly at a substantial angle relative to the bottom tray.

2. A portable burner for leaves and other rubbish comprising a base structure including a bottom tray, a pair of side walls extending upwardly from said tray, a rear wall extending upwardly from the rear end of said tray and intersecting said side walls, and a top wall extending between said side walls and forwardly from said rear wall, said walls and said tray defining a burning chamber therein, the forward ends of said walls cooperating with said tray to define an opening facing forwardly through which material may be delivered into the burning chamber, said forward ends of said side walls being inclined rearwardly at a substantial angle so that said opening slants upwardly and rearwardly relative to said bottom tray.

3. A burner according to claim 2 wherein said rear wall is inclined rearwardly.

4. A burner according to claim 3 wherein the side walls defining said burning chamber have the shape of a parallelogram.

5. A portable burner for leaves and other rubbish comprising a base structure including a bottom tray, a pair of side walls extending upwardly from said tray, a rear wall extending upwardly from the rear end of said tray and intersecting said side walls, a top wall extending between said side walls and forwardly from said rear wall, said walls and said tray defining a burning chamber therein and an opening facing forwardly through which material may be delivered into the burning chamber, said opening being rearwardly inclined at a substantial angle relative to said bottom tray, and means for supporting said base structure on the ground with the forward end of said tray in contact with the ground whereby leaves may be raked into the burning chamber directly from the ground, said supporting means including a wheel means for supporting the rear end of the base structure above the ground.

6. A burner for leaves and other rubbish comprising a base structure including a bottom tray, a pair of side walls extending upwardly from said tray, a rear wall extending upwardly from the rear end of said tray and intersecting said side walls, a top wall extending between said side walls and forwardly from said rear wall, said walls and said tray defining a burning chamber therein and an opening facing forwardly through which material may be delivered into the burning chamber, and means for supporting said base structure on the ground with the forward end of said tray in contact with the ground whereby leaves may be raked into the burning chamber directly from the ground, said supporting means including a wheel means for supporting the rear end of the base structure above the ground, said rear wall being inclined rearwardly from said tray, and said wheel means being positioned beneath said inclined rear wall.

7. A burner according to claim 5 comprising a handle mounted adjacent one side of said burner and to project forwardly therefrom, so that it can be grasped for moving the burner and will not block said forward opening.

8. A burner according to claim 7 wherein said handle is movably mounted and including means for positioning said handle in a first position in which said handle extends upwardly and forwardly with respect to said bottom tray, and a second position in which said handle extends downwardly and forwardly with respect to said bottom tray for supporting the forward end of the burner on the ground with the forward end of the tray being above the ground.

9. A burner for leaves and other rubbish comprising a base structure including a bottom tray, a pair of spaced side walls extending upwardly from said tray, a rear wall extending upwardly from the rear end of said tray and between said side walls, and a top wall extending between said side walls and forwardly from said rear wall, said walls and said tray defining a burning chamber therein and an opening facing forwardly through which material may be delivered into the burning chamber, said tray comprising two layers of material to provide heat insulation for protecting the surface beneath the burner during a burning operation.

10. A burner according to claim 9 wherein said tray layers are spaced from one another.

11. A burner according to claim 10 comprising a layer of heat insulating material positioned in the space between said spaced tray layers.

12. A burner according to claim 5 wherein said side walls and said top wall have a screen-like construction to provide openings for the access of air to the burning chamber and said rear wall is solid.

13. A burner for leaves and other rubbish comprising a base structure including a bottom tray, a pair of spaced side walls extending upwardly from said tray, a rear wall extending upwardly from the rear end of said tray and between said side walls, and a top wall extending between said side walls and forwardly from said rear wall, said walls and said tray defining a burning chamber therein and an opening facing forwardly through which material may be delivered into the burning chamber, said bottom tray comprising a layer of heat insulation, said rear wall being solid, and said side walls and said top wall being provided with openings to provide for the access of air to the burning chamber.

14. A portable burner for leaves and other rubbish comprising a base structure including a bottom tray, a pair of spaced side walls extending upwardly from said tray, a rear wall extending upwardly from the rear end of said tray and between said side walls, a top wall extending between said side walls and forwardly from said rear wall, said walls and said tray defining a burning chamber therein and an opening facing forwardly through which material may be delivered into the burning chamber, wheel means for supporting the rear end of said base structure above the ground, a handle mounted forwardly of said wheel means so that it can be grasped for moving said burner by way of said wheel means, means for removably mounting said side walls on said base structure including cooperating elongated channel defining portions on each of said side walls and said base structure, and means for removably mounting said rear wall on said side walls.

15. The burner according to claim 14 comprising means for hingedly mounting said top wall to said rear wall whereby said side walls and said rear and top walls may be disassembled from each other and from said base structure.

16. A portable burner for leaves and other rubbish comprising a base structure including a bottom tray, a pair of side walls extending upwardly from said tray, a rear wall extending upwardly from the rear end of said tray and intersecting said side walls, a top wall extending between said side walls and forwardly from said rear wall, said walls and said tray defining a burning chamber therein and an opening facing forwardly through which material may be delivered into the burning chamber, and wheel-like means for supporting said base structure on the ground with the forward end of said tray in contact with the ground whereby leaves may be raked into the burning chamber directly from the ground.

References Cited

UNITED STATES PATENTS

| | | | |
|---|---|---|---|
| 962,148 | 6/1910 | Jackson | 110—18 |
| 1,200,919 | 10/1916 | Bosserman | 110—19 |
| 2,743,686 | 5/1956 | Samuelson | 110—19 |
| 3,029,754 | 4/1962 | Doyle | 110—19 |
| 3,236,198 | 2/1966 | Kreft | 110—19 |

JAMES W. WESTHAVER, *Primary Examiner.*